United States Patent [19]

Burton et al.

[11] 4,186,929
[45] Feb. 5, 1980

[54] HYDRAULIC PUMP WITH AN IMPROVED SEALING ARRANGEMENT

[75] Inventors: Geoffrey W. Burton, Braydon, Nr. Swindon; Edward G. Morley, Malmesbury, both of England

[73] Assignee: Plessey Handel und Investments AG, Zug, Switzerland

[21] Appl. No.: 957,023

[22] Filed: Nov. 2, 1978

[30] Foreign Application Priority Data

Nov. 24, 1977 [GB] United Kingdom ............... 48886/77

[51] Int. Cl.$^2$ .......................... F16J 15/38; F16J 15/40
[52] U.S. Cl. ........................................ 277/27; 277/95; 277/96.2; 277/152; 277/65
[58] Field of Search ...................... 277/3, 27, 92, 93 R, 277/95, 152, 153, 165, 58, 65, 38, 39, 40, 41, 48, 49, DIG. 6

[56] References Cited

U.S. PATENT DOCUMENTS

| | | | |
|---|---|---|---|
| 2,833,577 | 5/1958 | Reynolds | 277/153 X |
| 2,862,733 | 12/1958 | Reiersen | 277/95 X |
| 3,135,128 | 6/1964 | Rudolph | 277/96.2 X |
| 3,291,491 | 12/1966 | Smith | 277/27 |
| 3,703,296 | 11/1972 | Malmstrom | 277/95 X |

FOREIGN PATENT DOCUMENTS

| | | | |
|---|---|---|---|
| 2206771 | 8/1973 | Fed. Rep. of Germany | 277/27 |
| 40330 | 3/1937 | Netherlands | 277/95 |
| 1134596 | 11/1968 | United Kingdom | 277/DIG. 6 |

*Primary Examiner*—Robert S. Ward, Jr.
*Attorney, Agent, or Firm*—Fleit & Jacobson

[57] ABSTRACT

A pump comprising a casing, a shaft which rotates in the casing when the pump is in use, a seal which is subjected to pump inlet pressure, a flexible ring member positioned between the seal and an inlet for the pump, and a non-flexible ring member positioned between the seal and the flexible ring member, the pump being such that one of the flexible or non-flexible ring members is mounted on the shaft for rotation with the shaft and the other flexible or non-flexible ring member is mounted around the shaft but spaced from the shaft, whereby when the flexible ring member is not flexed pump inlet fluid can pass to the seal and whereby any sudden increase in pump inlet pressure causes the flexible ring member to flex and sealingly engage with the non-flexible ring member to prevent the sudden increase in pump inlet pressure the seal.

6 Claims, 1 Drawing Figure

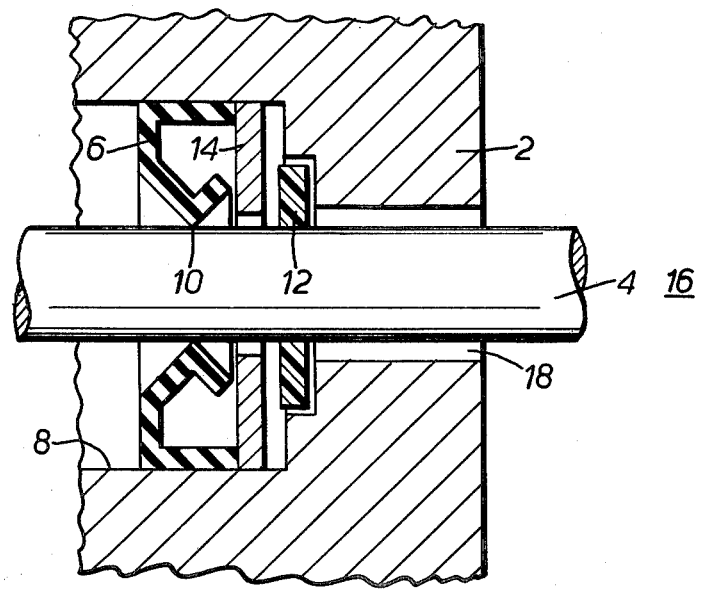

HYDRAULIC PUMP WITH AN IMPROVED SEALING ARRANGEMENT

This invention relates to a hydraulic pump having an improved sealing arrangement.

Hydraulic pumps are well known and they comprise a casing and a shaft which rotates in the casing when the pump is in use. Often, in use of the pumps, the pump is arranged to return some of its pump outlet fluid back to the inlet of the pump. An example of such a pump is a flow controlled steering pump. When the pump is employed to operate a load, large shocks on the load often get transmitted through the pump liquid as pressure shock waves and these tend to get reflected back to the pump inlet.

It is also known to employ a seal on the shaft, the seal being housed in a cavity which is directly connected to the pump inlet. These seals are adversely affected by the pressure shock waves and there is a need for a simple and inexpensive sealing arrangement for protecting the seals against the pressure shock waves.

It is an aim of the present invention to provide such a sealing arrangement whereby expensive high pressure seals do not have to be used and relatively low cost seals operating at low pressure can be employed.

Accordingly, this invention provides a pump comprising a casing, a shaft which rotates in the casing when the pump is in use, a seal which is subjected to pump inlet pressure, a flexible ring member positioned between the seal and an inlet for the pump, and a non-flexible ring member positioned between the seal and the flexible ring member, the pump being such that one of the flexible or non-flexible ring members is mounted on the shaft for rotation with the shaft and the other flexible or non-flexible ring member is mounted around the shaft but spaced from the shaft, whereby when the flexible ring member is not flexed pump inlet fluid can pass to the seal and whereby any sudden increase in pump inlet pressure causes the flexible ring member to flex and sealingly engage with the non-flexible ring member to prevent the sudden increase in pump inlet pressure reaching the seal.

Preferably, the ring member is mounted on the shaft and the non-flexible ring member is mounted in the casing. It is to be appreciated however that the reverse arrangement can be employed. When the non-flexible ring member is mounted in the casing, it is preferably arranged as a snug fit and also to abut against the seal. Advantageously, the flexible and non-flexible ring members are washers since these are extremely cheap to produce.

The flexible ring member is preferably made of polytetrafluoroethylene but other plastics materials, for example nylon, can be used if desired. Further, a metal can be employed if it is thin enough to flex as required. The polytetrafluorethylene is employed because it has self-lubricant properties and because it is not unduly adversely affected by temperature changes that might occur during the working of the pump.

The non-flexible ring member will usually be made of a metal but again a rigid plastics material could be employed if it were produced sufficiently thick enough not to flex. Obviously, a minor amount of flexing in the non-flexible washer can be tolerated.

As indicated above, the seals are known and any known seal may be employed. Often they are made of neoprene but other elastomers can be employed.

An embodiment of the invention will now be described solely by way of example and with reference to the accompanying drawing which shows part of a pump in accordance with the invention.

Referring to the drawing, there is shown part of a pump comprising a pump casing 2 having an axially mounted central shaft 4. During operation of the pump, the shaft 4 rotates with respect to the casing 2.

A known seal 6 of the shape shown fits around the shaft 4 in a cavity 8 formed within the casing 2. A sealing edge 10 of the seal 6 is operative to prevent fluid passing between this sealing edge 10 and the surface of the shaft 4.

Positioned on the shaft 4 and adapted to rotate with the shaft 4 is a flexible polytetrafluoroethylene washer 12.

A non-flexible metal washer 14 is a snug fit in the cavity 8 and, as shown, it abuts against the side of the seal 6. Also as shown, the washer 12 is positioned between the seal 6 and a pump inlet pressure area 16, and the washer 14 is positioned between the seal 6 and the washer 12.

During normal use of the pump, inlet pressure fluid can pass along the annular space 18 to the left as shown in the drawing to engage the seal 6. If a load being supplied by the pump receives a sudden shock which causes a reflected shock wave to be reflected to the pump inlet pressure area 16, then this pressure shock wave will travel along the annular space 18 and will strike the washer 12. The washer 12 will flex to the left as shown in the drawing and will sealingly engage with the non-flexible washer 14. This will prevent the shock wave from travelling any further so that the shock wave will not be able to contact and damage the seal 6. If the washers 12, 14 were not there, the shock wave could contact the seal 6 and could damage it, for example by turning it inside out if it were only a seal adapted to operate at low pressure. If it were a seal adapted to operate at high pressure, then increased costs would be involved in producing the high pressure seal and this is not desirable.

It is to be appreciated that the embodiment of the invention described above has been given by way of example only and that modifications may be effected. As, for example, the washer 14 can be fixed in position and spaced apart from the seal 6 and then washer 12 can be made of a material other than polytetrafluoroethylene. Preferably the pump will be a gear pump but other types of pump may also be employed.

What we claim is:

1. A pump comprising a casing, a shaft which rotates in the casing when the pump is in use, a seal which is subjected to pump inlet pressure, a flexible ring member positioned between the seal and an inlet for the pump, and a non-flexible ring member positioned between the seal and the flexible ring member, the pump being such that one of the flexible or non-flexible ring members is mounted on the shaft for rotation with the shaft and the other flexible or non-flexible ring member is mounted around the shaft but spaced from the shaft, whereby when the flexible ring member is not flexed pump inlet fluid can pass to the seal and whereby any sudden increase in pump inlet pressure causes the flexible ring member to flex and sealingly engage with the non-flexible ring member to prevent the sudden increase in pump inlet pressure reaching the seal.

2. A pump according to claim 1 in which the ring member is mounted on the shaft and the non-flexible ring member is mounted in the casing.

3. A pump according to claim 2 in which the non-flexible ring member is arranged as a snug fit in the casing and is also arranged to abut against the seal.

4. A pump according to claim 3 in which flexible and non-flexible ring members are washers.

5. A pump according to claim 4 in which the flexible ring member is made of polytetrafluoroethylene.

6. A pump according to claim 5 in which the non-flexible ring member is made of a metal.

* * * * *